Figure 1:
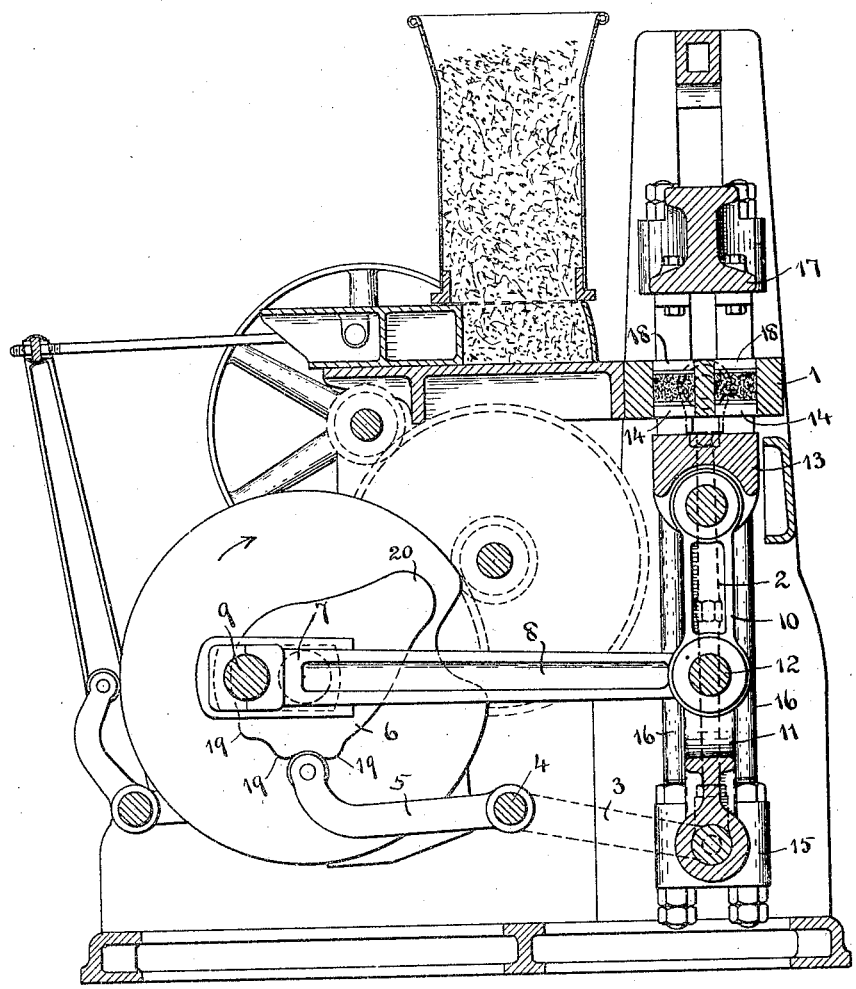

O. G. DIEFENDORF.
PROCESS OF MAKING ARTICLES OF PLASTIC MATERIALS.
APPLICATION FILED SEPT. 10, 1908.

934,395.

Patented Sept. 14, 1909.

O. G. DIEFENDORF.
PROCESS OF MAKING ARTICLES OF PLASTIC MATERIALS.
APPLICATION FILED SEPT. 10, 1908.
934,395.
Patented Sept. 14, 1909.
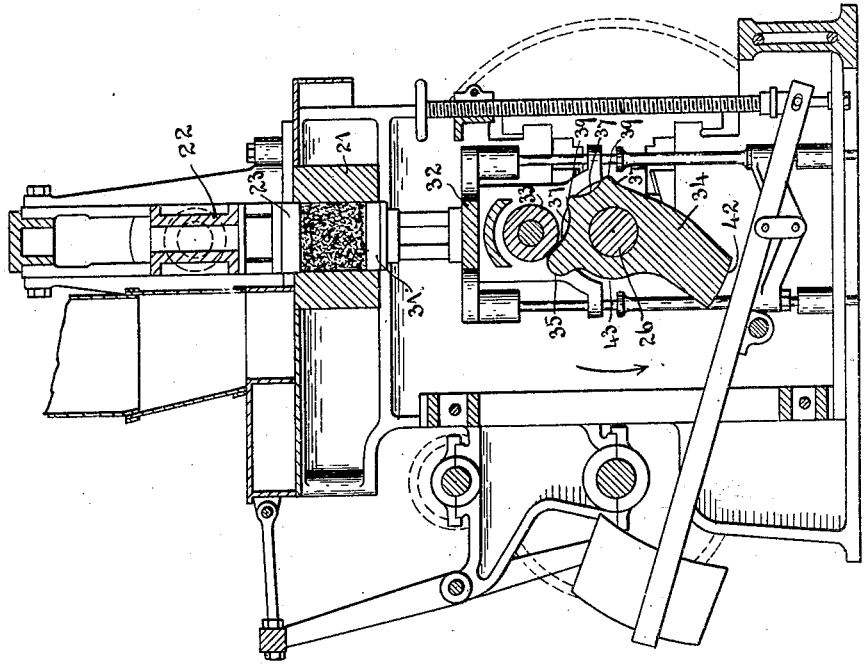
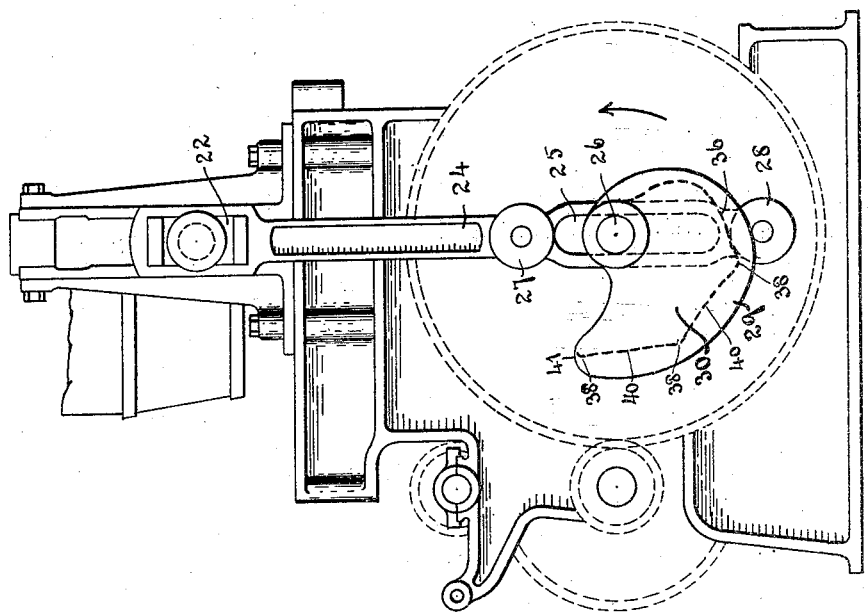

UNITED STATES PATENT OFFICE.

ORVIS G. DIEFENDORF, OF BINGHAMTON, NEW YORK, ASSIGNOR TO INTERNATIONAL BRICK MACHINE COMPANY, OF BINGHAMTON, NEW YORK.

PROCESS OF MAKING ARTICLES OF PLASTIC MATERIALS.

934,395.

Specification of Letters Patent. Patented Sept. 14, 1909.

Application filed September 10, 1908. Serial No. 452,471.

*To all whom it may concern:*

Be it known that I, ORVIS G. DIEFENDORF, a citizen of the United States, residing at Binghamton, in the county of Broome and State of New York, have invented certain new and useful Improvements in the Process of Making Articles from Plastic Materials, of which the following is a specification.

This invention relates to improvements in the process of manufacturing bricks and other articles from plastic materials, wherein the materials are pressed into the desired forms in machines designed for the purpose; while in a suitably plastic condition; and my object is to provide for imparting a smooth and perfect surface finish to the lateral or exposed faces of the bricks or other molded forms, while they are being pressed or molded into shape.

In carrying out this improved process I preferably employ the method of making the bricks or other molded articles substantially as described in my United States Letters Patent No. 766,938, dated August 9, 1904, for improvements in the process of making bricks; in connection with a modified form of the machine described in my United States Letters Patent No. 852,934, dated May 7, 1907, for improvement in brick making machines; or in connection with a suitably modified form of machines of the type described in the patent to Leonhardt, No. 523,797, dated July 21, 1894, for machines for pressing bricks, tiles, etc.

To attain my object I construct the machines in the manner illustrated in the accompanying drawings, in which:

Figure 1 represents a vertical longitudinal section through the machine described in my said Letters Patent, No. 852,934; and Figs. 2 and 3, a side elevation and a vertical longitudinal section, respectively, of a modified form of the machine described in the patent to Leonhardt, No. 523,797; so much of the machines only being shown as is necessary to illustrate the modifications required to adapt them to carry out my improved process.

In my form of machine, the molding portion of the apparatus comprises a vertically movable mold 1, (see Fig. 1), the ends of which project through guide ways in the side frames of the machine and are coupled outside of said side frames, at each side of the machine, by means of links 2 and levers 3 to an operating shaft 4; one side of said links and arms being shown in broken lines in the illustration. The shaft 4 is operated by means of an arm 5 which contacts with a cam 6 fastened to the main shaft 7 of the machine. The shaft 7 is provided with a crank 9 which operates a connecting rod 8 coupled to toggle arms 10 and 11 by means of a pin 12. The toggle arms 10 are coupled to a cross head 13 which is held in fixed position between the side frames, said cross head carrying upon its upper face one or more plungers 14, adapted to close the bottom opening, or openings through the mold. The lower toggle arms 11 are fastened to a reciprocating cross head 15, the latter cross head being coupled, by means of the vertical rods 16, to an upper reciprocating cross head 17, which carries one or more upper plungers 18 adapted to enter the opening, or openings at the top of the mold.

The operation of this machine is preferably as follows:—After the mold filler has deposited the material in the mold the shaft 7, rotating in the direction indicated by the arrow, actuates the crank and connecting rod to draw the toggle arms into vertical alinement, thereby forcing the cross head 15 downward and drawing the plungers 18 into the mold to compress the material therein and form it into the desired shape. This position of the parts of the machine is shown in the illustration. During this period of compression, and while the upper plungers are being held practically stationary in their lowermost positions; that is to say, during the period in which the crank pin 9 is passing the dead center, the mold 1 is given an up and down motion by means of the projections 19 formed on the cam 6, which act on the arm 5 to raise and to lower the mold the required distance. As the machine is shown, there are three of these projections and there will be, therefore, imparted to the mold three movements while the blocks are under compression. This up and down motion of the mold, while the molded material is in this condition, acts to bring the outside particles to a true and smooth surface and, furthermore, imparts to these lateral faces a superior polish and finish, with true and sharp cut corners and edges. As the machine continues to operate, the crank 9 acts upon the toggle arms to elevate the cross head 17, and the projection 20 on the cam 6 acts at the same time to elevate the mold;

the relative speeds of elevation of the cross head and mold being such that, after the molded forms have been raised clear of the lower plungers 14, the mold will rise more rapidly than the upper plungers, thereby delivering the molded forms from the bottom of the mold upon a pallet inserted thereunder, as described in my said Letters Patent. During this ejection from the mold the lateral faces of the molded forms receive a polishing action for the fourth time.

In the machine constructed as shown in the Leonhardt patent, the mold 21 is held stationary at all times and the molded forms, after compression, are elevated by the lower plunger or plungers to the top of the mold, where they are moved out upon a receiving table by the action of the mold filler when thrown forward to fill the mold in the usual manner. In this type of machine, therefore, it is necessary, in imparting the finishing and polishing action to the lateral faces of the molded forms, to provide means for raising and lowering the upper and lower plungers in unison, and while they are compressing the material in the mold. To accomplish this, the cams which operate the upper and lower plungers must be modified in some such manner as illustrated in Figs. 2 and 3, wherein 21 represents the stationary mold, and 22 the upper cross head, which is adapted to slide in vertical guides formed on the side frames of the machine. At each side of this cross head there are links 24, the lower ends of which are slotted at 25 to pass the operating shaft 26. At points above and below the slot 25 the links are provided with rollers 27 and 28 respectively. Fastened to the shaft 26 is a double faced cam, or a pair of cams fastened side by side, said cams being indicated by the reference numerals 29 and 30 respectively. The outer cam 29 acts upon the roller 27 to elevate the cross head, while the inner cam 30 acts upon the roller 28 to depress the cross head, said roller 28 being made narrower than the roller 27 to clear the cam 29. The lower plungers are mounted on the cross head 32, said cross head being provided with rollers 33 to contact with cams 34 fastened upon the shaft 36, there being two of these cams provided in the machine, as described in the Leonhardt patent. In the position of the parts as shown in the drawings, the projection 35 on cam 34 has just passed the roller 33 and the plungers 23 and 31 have been drawn together to compress the material in the mold. As the roller 33 rides down into the depression 37 on cam 24, the rollers 28 on the links 24 will be forced downward by the portion 36 of cams 30 to the first of the projections 38 on said cams, thereby causing the upper plungers to follow the lower plungers at a fixed distance therefrom. As the shaft 26 continues to rotate the lower plungers will be forced upward by the projections 39 on cams 34 and the upper plungers will be permitted to rise by the depressions 40 on the cams 30, the depressions 37 and the projections 39 on cams 34 and the corresponding projections 38 and depressions 40 on the cams 30 being twice repeated, thereby imparting three up and down motions to the material in the mold to effect the polishing and finishing action. After the points 41 on the cams 29 and 30 have passed the rollers 28, cams 29 will engage the upper rollers 27 and elevate the cross head 22. At the same time the projections 42 on cams 34 will move the lower plungers upward until their faces are flush with the upper side of the mold 21, said plungers being held in such position for a short period while the mold filler is thrown forward to eject the molded forms. The lower plungers then drop until their rollers 33 engage the surfaces 43 of cams 34, the material from the mold filler being then deposited in the mold.

In carrying out this process and to form perfect and smooth faced bricks, or other molded forms, I preferably employ a mixture of cement with sand, or other finely ground or pulverized materials. The material is first slightly dampened and thoroughly mixed with cement, preferably Portland cement; or the material and the cement may be mixed dry and then slightly dampened, the amount of liquid added not being sufficient to make the mixture into a paste. The manner of testing the mixture, in practice, to find if it is sufficiently damp, is to press a small amount in the hand and if it contains the proper amount of moisture it will just remain in shape when released, but if touched will fall apart. The material, having been thus properly mixed with the cement and dampened, is placed in the hopper of either of the machines described, or in any machine adapted to operate in the manner described, and thereafter fed to the mold, thereby being molded into the desired form and receiving during the process of molding the finishing and polishing action as above described. After the bricks or other molded forms are taken from the machine they are allowed to stand until a thin crust has formed on the outside surface. The time which this crust requires to form varies according to the conditions of the atmosphere. On a very bright, dry day it will take about two hours. When this crust has formed, the bricks, or other molded forms will again be moistened, either to complete or partial saturation by spraying them with water, or completely submerging them in water, or subjecting them to an atmosphere of moist steam. This second saturation, or partial saturation of the molded forms insures the proper wetting of the cement and the other particles of the mixture to the center thereof. After subjecting the bricks, or other molded forms to the second wetting, they are allowed to stand preferably from 20 to 48 hours, during which time the cement in the interior hardens and firmly secures together the particles of ground stone, sand, gravel or other friable earth, of which the mixture is composed, and it is found that, when finally dried, the molded forms neither shrink nor expand when exposed, and that they retain extremely smooth and, with some materials, polished surfaces, with clean cut edges and sharp corners.

By using a minimum amount of the liquid in forming the bricks, or other molded articles into shape, there will be no entrapping of the liquid in the material or forcing it out in channeling streams during the pressing of the material into shape in the mold. The particles are, therefore, pressed into a solid mass both in the interior and on the exterior surfaces, and the rubbing action, while in the mold and under pressure, causes all interstices on the exterior to be filled up and the particles to be brought out so as to form perfectly smooth and uniform surfaces. Where materials of an oily nature are employed a very high degree of polish may be thus imparted to the lateral surfaces. The crust formed during the first drying serves to maintain perfectly the form into which the materials have been pressed, while undergoing the second wetting, which is necessary to insure the proper action of the cement.

Without, therefore, confining myself to any particular arrangement of machine or appliance for forming the molded articles; or to the degree of pressure imparted to the materials while in the molds; or to any particular manner of mixing and drying the materials, either prior to or after they have been molded into shape, what I claim as my invention and desire to secure by Letters Patent is:

1. The process comprising the forming of plastic material into the desired shape in a suitable mold and subjecting one or more surfaces thereof to a reciprocating finishing action while in the mold, whereby the particles of material will be acted upon to fill all interstices in such surfaces and thereby render said surfaces smooth and uniform.

2. The process comprising the forming of plastic material into the desired shape in a suitable mold and subjecting one or more surfaces thereof to a reciprocating finishing action while subjected to pressure in the mold.

3. The process comprising the forming of a moistened mixture of cement and other materials into the desired shape in a suitable mold, subjecting one or more surfaces thereof to a reciprocating finishing action while under pressure in the mold, then permitting a crust to form thereon, and thereafter wetting the molded form sufficiently to cause the cement in the interior to properly set.

In testimony whereof I have affixed my signature, in presence of two witnesses.

ORVIS G. DIEFENDORF.

Witnesses:
F. J. BAYLESS,
KATHERINE G. CHICHESTER.